United States Patent
Nelson

(10) Patent No.: US 7,263,332 B1
(45) Date of Patent: Aug. 28, 2007

(54) METHODS AND APPARATUS FOR COMMUNICATING IN A VEHICLE AND OTHER RADIO ENVIRONMENTS

(75) Inventor: Steven K. Nelson, Carlisle, MA (US)

(73) Assignee: Cool & Useful Products, LLC, Carlisle, MA (US)

( * ) Notice: Subject to any disclaimer, the term of this patent is extended or adjusted under 35 U.S.C. 154(b) by 293 days.

(21) Appl. No.: 10/950,967

(22) Filed: Sep. 27, 2004

Related U.S. Application Data

(63) Continuation-in-part of application No. 10/821,656, filed on Apr. 9, 2004, now abandoned.

(60) Provisional application No. 60/461,600, filed on Apr. 9, 2003.

(51) Int. Cl.
*H04B 1/38* (2006.01)

(52) U.S. Cl. .............. 455/66.1; 455/90.1; 455/344; 381/86

(58) Field of Classification Search ........... 455/95, 455/90.2, 90.3, 66, 344–346, 66.1; 381/86
See application file for complete search history.

(56) References Cited

U.S. PATENT DOCUMENTS 5,301,361 A * 4/1994 Koike ................... 455/95
2003/0063756 A1 * 4/2003 Geerlings et al. .......... 381/86

* cited by examiner

*Primary Examiner*—Lee Nguyen
(74) *Attorney, Agent, or Firm*—Chapin IP Law, LLC; Barry W. Chapin, Esq.

(57) ABSTRACT

A transmitter device for use in a vehicular application includes a cable, an input port, a modulator, and an antenna device. The cable of the transmitter device receives power from a power source associated with a vehicle to power circuitry in the transmitter device. The input port of the transmitter device receives audio input from a user in the vehicle speaking into a microphone. The modulator device modulates the audio input received from the input port onto a carrier frequency to produce a modulated signal. The antenna device of the transmitter device receives the modulated signal and generates (e.g., transmits) a wireless radio signal to a radio receiver in the vehicle. The radio receiver in the vehicle is tuned to i) receive the wireless radio signal and ii) play the audio input received from the user over at least one corresponding speaker associated with the radio receiver.

28 Claims, 6 Drawing Sheets

METHODS AND APPARATUS FOR COMMUNICATING IN A VEHICLE AND OTHER RADIO ENVIRONMENTS

RELATED APPLICATION

This is a continuation in part application of U.S. patent application Ser. No. 10/821,656 entitled "VEHICLE COMMUNICATION SYSTEM," filed on Apr. 9, 2004 now abandoned, which itself is an application relating to and claiming the benefit of earlier filed U.S. Provisional Patent Application Ser. No. 60/461,600 entitled "VEHICLE COMMUNICATION SYSTEM," filed on Apr. 9, 2003, the entire teachings of all of which are incorporated herein by this reference.

BACKGROUND

During past years, vehicles of increasingly larger size have gained popularity. Such vehicles typically have two or more rows of seats for seating five or more passengers behind the driver. In these vehicles, as in other vehicles, the driver must face forward in the direction of travel to keep their eyes on the road and in order to be aware of traffic conditions. Thus, the driver in many circumstances faces away from seated occupants who may be seated one, two or more rows behind the front seat. Consequently, it is difficult for the driver and other front seat passengers to communicate with persons located in the rear of the vehicle. In the same vein, therefore, it is difficult for the passengers located in the rear to hear the driver when he or she speaks or for the driver to hear the passengers when they speak. This is especially true in larger vehicles.

It is known to employ a microphone in the front or rear seating area of a vehicle to pick up acoustical signals (e.g., voices, sound, etc.) from persons in such areas. The microphone detects the presence of an acoustical signal, which is then amplified and reproduced by a speaker in another seating area.

One problem associated with such conventional systems is acoustical feedback between the speaker and a corresponding microphone located at each occupant. Microphone reception and related vehicles noise is generally re-transmitted through the microphone in speakers located within the passenger seating area, thereby further degrading communications.

Also known are audio communication systems including a plurality of microphone and speaker combinations located within the passenger seating area, combined with a digital signal processor that simultaneously outputs the signals of each microphone through all corresponding attached speakers. The digital signal processor is utilized to substantially eliminate unwanted external interference and feedback, while also allowing duplex communication between passengers and the driver. Each microphone and speaker combination can be integrated (at an auto manufacturer) into a single audio entertainment subsystem to provide all such functionality.

SUMMARY

Unfortunately, there are further deficiencies associated with conventional methods of providing enhanced audio communications in a vehicle. For example, conventional methods require that a separate sound system be installed in the vehicle to support communications between a driver and other passengers in the vehicle such as a tour bus. This extra sound equipment can be quite expensive to install and is therefore not an acceptable solution for use in non-commercial applications.

It is an advancement in the art to provide enhanced communications in a vehicle via use of presently existing radio equipment such as a radio receiver (e.g., a standard AM/FM radio that receives signals from radio stations) and corresponding speakers. Use of already installed acoustical equipment (e.g., the radio and corresponding speakers) eliminates a need to install additional sound system equipment such as a separate voice amplification sound system. A general embodiment of the invention therefore is directed towards a transmitter device for communicating to at least one occupant in a vehicle. The transmitter device comprises a cable, an input port, a modulator, and an antenna device.

The cable of the transmitter device receives power from a power source associated with the vehicle. The power is at least in part used to power a microphone associated with the transmitter device. Additionally the power can be used to power other electronic circuitry in the transmitter device. The input port of the transmitter device receives audio input from a user in the vehicle speaking into the microphone. The modulator device modulates the audio input received from the input port onto a carrier frequency to produce a modulated signal. In one embodiment, the carrier frequency is between 89 and 108 megahertz (e.g., a typical FM radio station carrier frequency). The antenna device of the transmitter device receives the modulated signal and generates (e.g., transmits) a wireless radio signal to a radio receiver in the vehicle. The radio receiver in the vehicle is tuned to i) receive the wireless radio signal and ii) play the audio input received from the user over at least one corresponding speaker associated with the radio receiver. Consequently, a user of the transmitter device speaks into the microphone and the audio signal plays on speakers driven by the radio receiver.

Thus, the transmitter device modulates the audio signal from the microphone onto a carrier frequency to a radio receiver in the vehicle. The radio receiver then plays the audio signal over a corresponding at least one speaker associated with the radio receiver. Thus, the user can amplify (via a volume control knob or button on the radio receiver) his or her voice over the at least one speaker in the vehicle.

In further more specific embodiments, feedback or sound from the at least one speaker associated with the radio can be reduced. For example, in one embodiment, the transmitter device includes a filter to limit which range of frequencies associated with the audio input are modulated onto the carrier frequency to produce the wireless radio signal transmitted to the radio receiver in the vehicle. A selection of which frequencies to pass varies depending on the application. For instance, in one application, the filter in the transmitter device limits the range to frequencies of the audio input modulated onto the carrier frequency to those below 4500 hertz. In another application, the filter in the transmitter device limits the range to frequencies of the audio signal modulated onto the carrier frequency to those below 3000 hertz. In yet another application, the filter in the transmitter device limits the range to frequencies of the audio signal modulated onto the carrier frequency to those below 1500 hertz. The cutoff can be set to any value between 500 and 6000 Hertz. The transmitter device can include a knob or mechanism to control a cutoff frequency of the low pass filter. Thus, in such an application, a user can adjust the filter to a value that works best to reduce unwanted feedback during use.

In one embodiment, the antenna device or portion thereof is disposed in parallel to a wire that conveys the audio signal received from the microphone to the input port. Thus, the antenna can be integrated into the same cable that conveys the audio signal from the microphone to the input port of the transmitter device.

In one embodiment, the radio receiver can be tuned to receive a signal from a radio station playing music, talk shows, etc. The transmitter device can be manually adjusted or tuned to generate a signal at the carrier frequency to which the transmitter device is tuned. The transmitter device includes a detector circuit to detect when the user generates the audio input by speaking into the microphone. The transmitter circuit also includes a control circuit to i) activate the transmitter device to transmit the wireless radio signal to the radio receiver in the vehicle when the user generates sound into the microphone, and ii) deactivate the transmitter device from transmitting the wireless radio signal to the radio receiver in the vehicle when the user does not generate sound into the microphone. Thus, when a user does not speak into the microphone, the radio receiver receives a signal from a radio station to which it is tuned and plays the music or sound. When a user speaks into the microphone, the transmitter device overpowers the radio station signal such that the user's voice is played over the speakers in the vehicle. In this way, a driver of the vehicle (as well as passengers) can listen to the radio station while the user is not speaking into the microphone. If the user is a parent and passengers are children, the parent can speak to their children over via existing radio equipment in the vehicle. Note that although embodiments of the invention are directed toward use in vehicles, the techniques of the invention can be extended to other application as well such as business meetings, etc.

According to one embodiment, each of multiple users in the vehicle communication system has their own transmitter device for speaking over the radio channel to which the radio is tuned. When a user speaks into a respective transmitter device, it transmits a corresponding audio signal to the radio receiver to play over the speakers. For example, a vehicular communication system includes multiple transmitter devices, each being configured to generate a signal to the radio receiver when sound is detected. Each of the multiple transmitter devices is selectively activated such that a respective transmitter device i) generates a given wireless radio signal to the radio receiver when a respective user speaks into an associated microphone device and ii) does not generate a given wireless radio signal to the radio receiver when a respective user does not speak into an associated microphone. Consequently, multiple passengers in the vehicle can communicate over the radio receiver without interfering with each other. That is, while one passenger is speaking, the other passengers can listen to the sound generated by speakers driven by the radio receiver. When one passenger discontinues speaking, another passenger in the vehicle may speak over the radio receiver to other passengers.

A system according to an embodiment of the invention expands upon the principles discussed above. For example, in one embodiment, a vehicular communication system enables multiple users to share communications over a radio receiver and corresponding at least one speaker in a vehicle. The system includes at least two transmitter devices (similar in some respects to those discussed above) for use by corresponding users in the vehicle as well as a base station device to receive corresponding wireless radio signals from the at least two transmitter devices. During operation, the base station receives signals from the at least two transmitter devices and conveys audio signals onto the radio receiver.

Each of the at least two transmitter devices includes a microphone, an input port, a modulator, and an antenna device. The microphone of each transmitter device receives audio signals generated by corresponding users' voices. The input port of each transmitter device receives audio input from a corresponding user in the vehicle speaking into the microphone. The modulator device of each transmitter device modulates the audio input received from the input port onto a first carrier frequency (e.g., not an FM frequency but instead another carrier capable of being received by the base station) to produce a modulated signal. The antenna device of each transmitter device receives the modulated signal and transmits a corresponding wireless radio signal to the base station.

The base station device receives corresponding wireless radio signals from the at least two transmitter devices. The base station device includes a receiver, a modulator device and an antenna device. The receiver of the base station receives the corresponding wireless radio signals and detects corresponding audio input generated by a corresponding user in the vehicle speaking into the microphone. The modulator device of the base station modulates the corresponding audio input received from the at least two transmitter devices onto an FM (Frequency Modulated) carrier frequency to produce a modulated signal, the carrier frequency being between 89 and 108 megahertz. The antenna device of the base station receives the modulated signal and transmits a wireless radio signal to a radio receiver in the vehicle, the radio receiver being tuned to i) receive the wireless radio signal and ii) play the audio input received from the user over at least one corresponding speaker associated with the radio receiver. Consequently, the base station enables multiple users (or an expanded number of users) to communicate in the vehicle over a speaker system associated with the radio receiver. That is, a vehicular communication system can include only a single base station capable of receiving communication signals from multiple users in the vehicle.

In furtherance of the aforementioned embodiment, each of the at least two transmitter devices are operated by respective users in the vehicle to selectively generate corresponding wireless radio signals from the multiple transmitter devices to the radio receiver in response to the users speaking into respective microphones of the multiple transmitter devices. Each of the at least two transmitter devices are activated such that a respective transmitter device i) generates a given wireless radio signal to the base station when a respective user speaks into an associated microphone device and ii) does not generate a given wireless radio signal to the base station when a respective user does not speak into an associated microphone. This technique reduces interference of multiple signals received at the base station.

BRIEF DESCRIPTION OF THE DRAWINGS

The foregoing and other objects, features, and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

DETAILED DESCRIPTION

In one embodiment of the invention, a transmitter device for use in a vehicular application includes a cable, an input port, a modulator, and an antenna device. The cable of the transmitter device receives power from a power source associated with a vehicle to power circuitry in the transmitter device. The input port of the transmitter device receives audio input from a user in the vehicle speaking into a microphone. The modulator device modulates the audio input received from the input port onto a carrier frequency to produce a modulated signal. The antenna device of the transmitter device receives the modulated signal and generates (e.g., transmits) a wireless radio signal to a radio receiver in the vehicle. The radio receiver in the vehicle is tuned to i) receive the wireless radio signal and ii) play the audio input received from the user over at least one corresponding speaker associated with the radio receiver. Consequently, the transmitter device receives an audio signal from a user speaking into a microphone and plays back the audio signal over speakers driven by the radio receiver.

Figure 1:
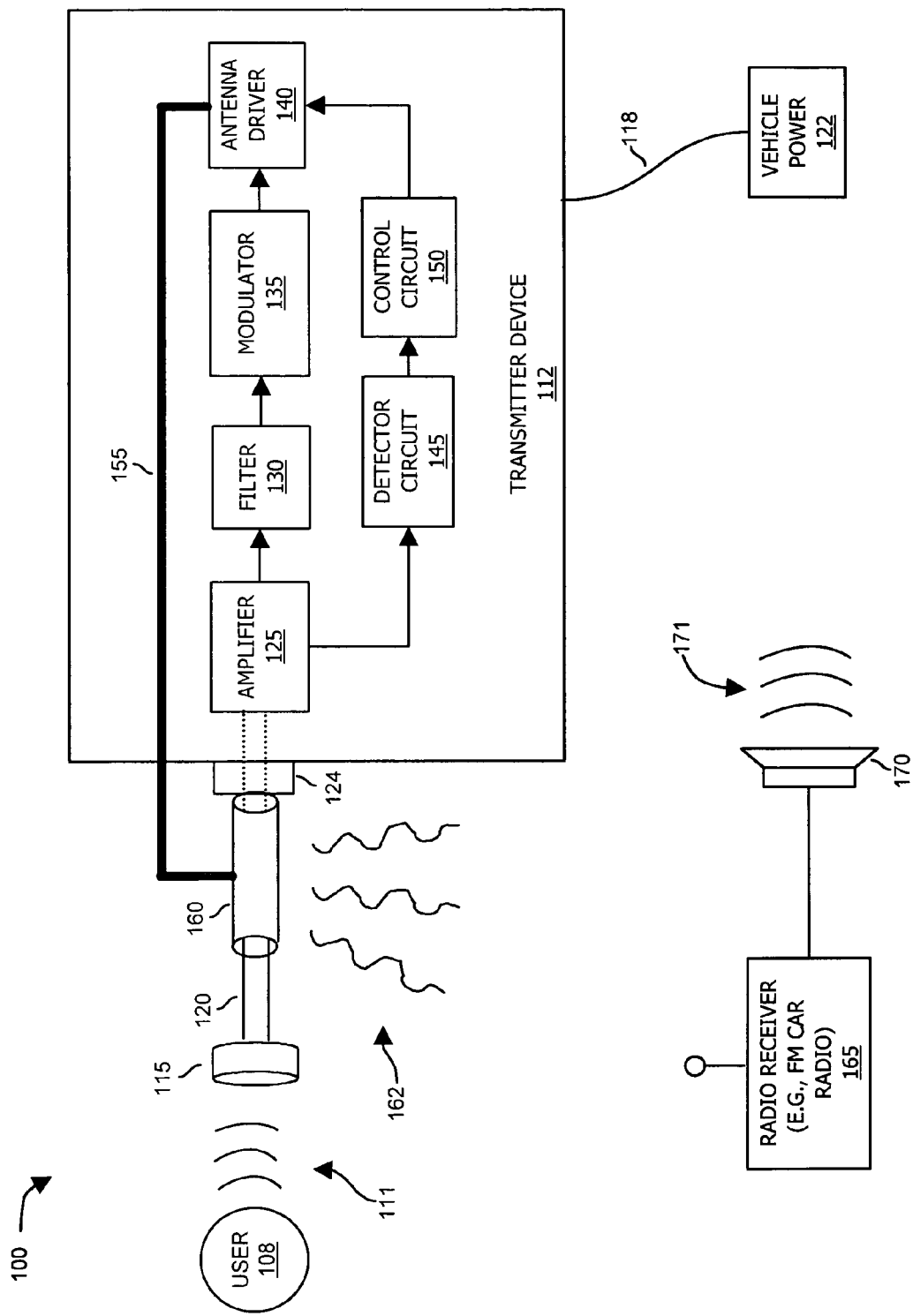
FIG. 1 is a block diagram of a transmitter device configured to operate according to an embodiment of the invention.

FIG. 1 is a block diagram of a transmitter device configured to operate according to an embodiment of the invention. As shown, acoustical environment 100 such as a vehicle includes user 108, acoustical signal 111, microphone 115, conductors 120, amplifier 125, filter 130, modulator 135, antenna driver 140, audio signal detector 145, control circuit 150, conductive path 155, transmitter device 112, cable 118, vehicle power 122, antenna 160, wireless signal 162, radio receiver 165, speaker system 170 and acoustical signal 171.

During an operational mode, the cable 118 of the transmitter device 112 receives power from vehicle power 122. The power is at least in part used to power microphone 115 associated with the transmitter device 112. Additionally the power can be used to power other electronic circuitry such as amplifier 125, modulator 135, audio signal detector 145, control circuit 150, etc. in the transmitter device 112.

User 108 generates acoustical signal 111 into microphone 115. Microphone 115 converts the acoustical signal 111 into an electrical audio input signal conveyed along conductors 120 to input port 124. The input port 124 of the transmitter device 112 receives the audio input (e.g., acoustical signal 111) from a user 108 in the vehicle speaking into the microphone 115.

Amplifier 125 receives the audio input associated with user 108 and drives filter 130, whose output feeds modulator 135. The modulator 135 (e.g., modulator device) modulates the audio input received from the input port 124 onto a carrier frequency, $f_c$, to produce a modulated signal that drives antenna driver 140 and antenna 160. In one embodiment, the carrier frequency $f_c$ is between 88 and 108 megahertz (e.g., a typical FM radio station carrier frequency). This is a standard range of FM (Frequency Modulated) radios in the United States that can be picked up by most car radios.

The antenna driver 140 of the transmitter device 112 receives the modulated signal and generates (e.g., transmits) a wireless radio signal 162 via antenna 160 to a radio receiver 165 in the vehicle. The radio receiver 165 in the vehicle is tuned to i) receive the wireless radio signal 162 and ii) play the audio input received from the user 108 over at least one corresponding speaker (e.g., speaker system 170) associated with the radio receiver 165. Consequently, a user 108 of the transmitter device 112 speaks into the microphone 115 and the audio signal plays on speaker system 170 driven by the radio receiver 165.

Thus, the transmitter device 112 modulates the audio signal detected by microphone 115 onto a carrier frequency to a radio receiver 165 in the acoustical environment 100 of the vehicle. The radio receiver 165 then plays the audio signal over a corresponding speaker system 170 associated with the radio receiver 165. Thus, the user 108 can amplify (via a volume control knob or button on the radio receiver 165) his or her voice over the speaker system 170 in the vehicle.

Feedback from the speaker system 170 causing acoustical screeching can be reduced. For example, in one embodiment, the transmitter device 112 includes filter 130 to limit which range of frequencies associated with the audio input received through input port 124 are modulated onto the carrier frequency $f_c$ to produce the wireless radio signal 162 transmitted to the radio receiver 165. A selection of which frequencies to pass by filter 130 varies depending on the application. For instance, in one application, the filter 130 in the transmitter device 112 limits the range to frequencies of the audio input modulated onto the carrier frequency to those below 4500 hertz. In another application, the filter 130 in the transmitter device 112 limits the range to frequencies of the audio signal modulated onto the carrier frequency to those below 3000 hertz. In yet another application, the filter 130 in the transmitter device 112 limits the range to frequencies of the audio signal modulated onto the carrier frequency to those below 1500 hertz.

In one embodiment, the cutoff setting of the filter 130 can be set to any value between 500 and 6000 Hertz. The transmitter device 112 can include a knob or mechanism to control the cutoff frequency of the low pass filter 130. Thus, in such an application, a user can adjust the filter 130 to a value that works best to reduce unwanted feedback to thus increase performance of the transmitter device 112 during use in vehicle or other acoustical environment 100.

In one embodiment, the antenna 160 (e.g., a conductive shield encompassing a length of conductors 122) is disposed in parallel to conductors 120 (e.g., one or more wires) that conveys the audio signal received from the microphone 115 to the input port 124. That is, the antenna 160 can be integrated into the same cable that conveys the audio signal from the microphone to the input port 124 of the transmitter device 1112. In one embodiment, antenna 160 is braided wire shielding a portion of the length of conductors 120 which themselves are a twisted pair or wires to carry an audio signal form microphone 115.

In one embodiment, the radio receiver 165 can be tuned to receive a signal from a radio station playing music, talk shows, etc. The transmitter device 112 can be manually adjusted or tuned to generate a signal at the carrier frequency to which the transmitter device 112 is tuned to transmit to the radio receiver 165. The carrier frequency can be adjusted by adjusting a knob or control mechanism of the transmitter device 112 such that a user 108 can listen to a particular radio station and then adjust the carrier frequency of the transmitter device 112 to the appropriate value to be played on the radio receiver 165 when the user 108 speaks into microphone 115.

The transmitter device 112 includes a detector circuit 145 to detect when the user 108 generates the audio input by speaking into the microphone 115. The transmitter circuit 112 also includes a control circuit 150 to i) activate the transmitter device 112 to transmit the wireless radio signal 162 to the radio receiver 165 in the vehicle when the user 108 generates sound into the microphone 115, and ii) deactivate the transmitter device 112 from transmitting the wireless radio signal 162 to the radio receiver 165 in the vehicle when the user 108 does not generate sound into the microphone 115. Thus, when a user 108 does not speak into the microphone 115, the radio receiver 165 receives a signal from a radio station to which it is tuned and plays the corresponding music or sound. When a user 108 speaks into the microphone 115, the transmitter device 112 overpowers the radio station signal such that the user's voice is played over the speaker system 170 in the vehicle. In this way, a driver of the vehicle (as well as passengers) can listen to the radio station while the user 108 is not speaking into the microphone 115. If the user 108 is a parent and passengers in the vehicle are children, the parent can speak to their children over existing radio equipment (e.g., radio receiver 165 and speaker system 170) in the vehicle. Note that although embodiments of the invention are directed toward use in vehicles, the techniques of the invention can be extended to other acoustical environments as well such as business meetings, etc.

Figure 2:
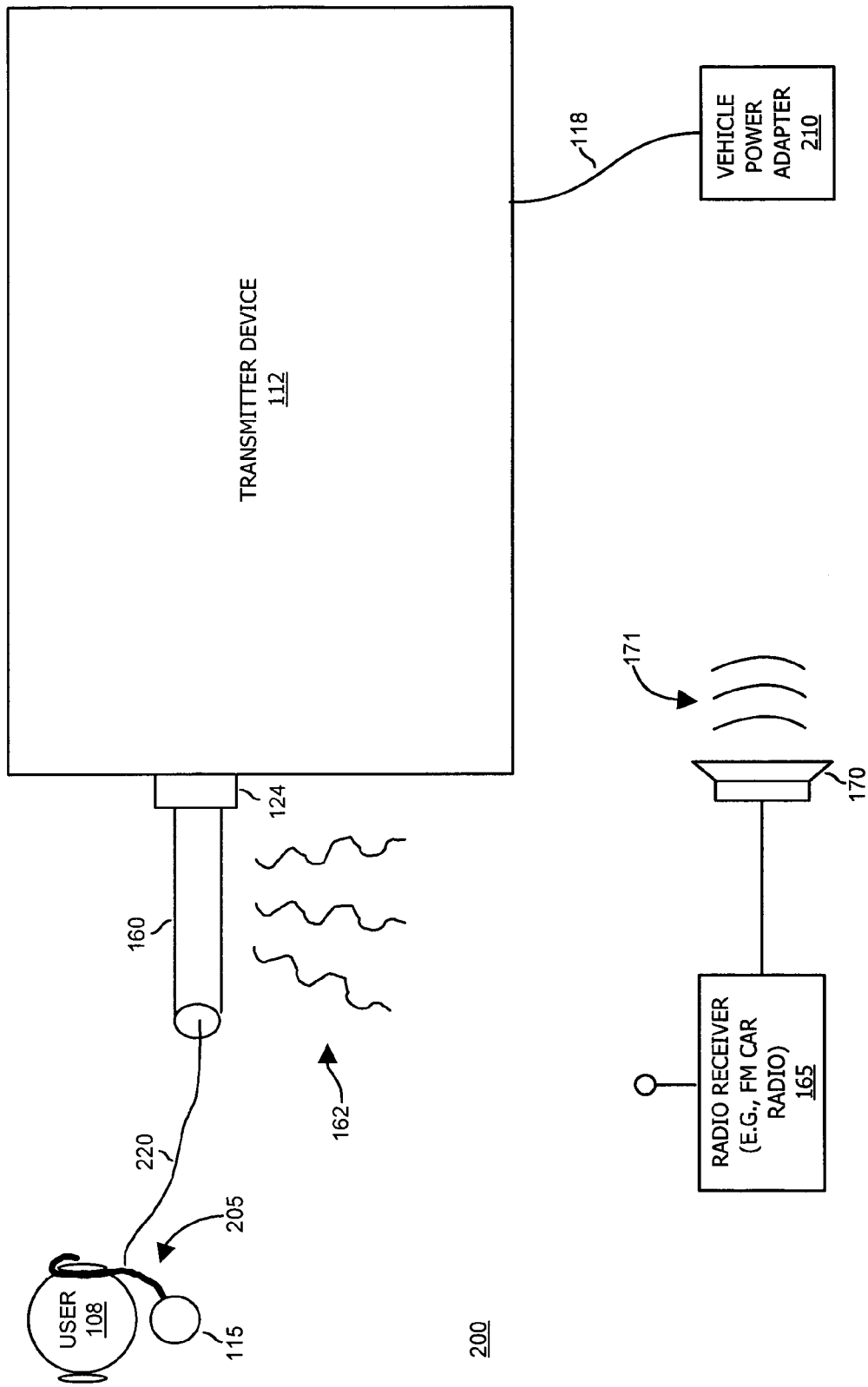
FIG. 2 is a pictorial diagram of a transmitter device and related components according to an embodiment of the invention.

FIG. 2 is a pictorial diagram of a transmitter device 112 and related components according to an embodiment of the invention. As shown, communication system 200 includes an earpiece 205 with microphone 115. The combination of earpiece 205 and microphone 115 are coupled to transmitter device 112 via cable 220. A portion of cable 220 includes antenna 160 for transmitting wireless radio signal 162 to radio receiver 165. Earpiece 205 includes an ear clip so that user 108 can use microphone 115 with his or her hands free. Cable 118 couples power received from adapter 210 to transmitter device 112.

Figure 3:
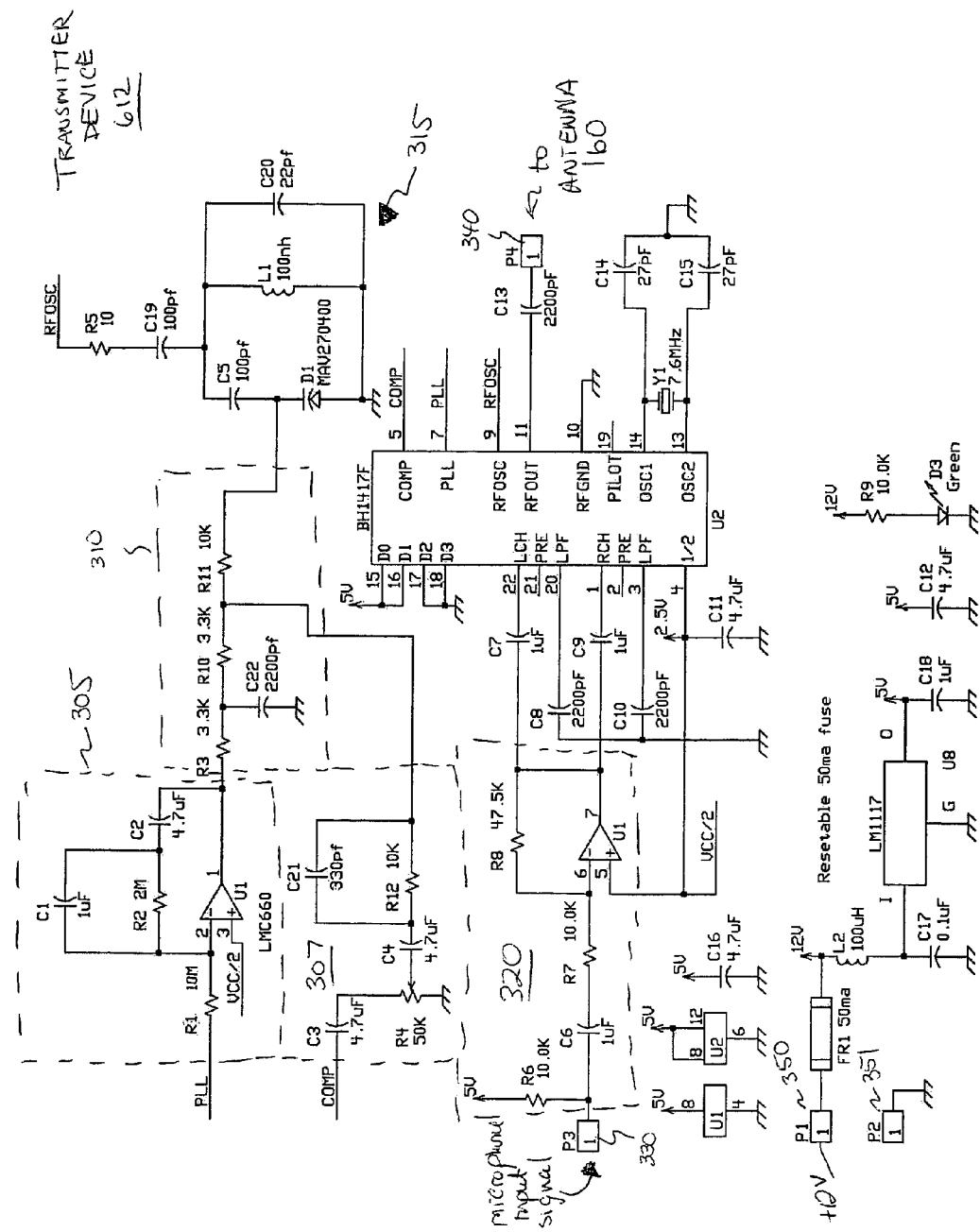
FIG. 3 is a circuit diagram illustrating electronic circuitry according to an embodiment of the invention.

FIG. 3 is a circuit diagram illustrating electronic circuitry according to an embodiment of the invention. As shown, transmitter device 112 includes stages of electronic circuitry to receive an audio signal and transit the signal on an FM carrier frequency to, for example, a vehicle's radio. Stage 305 in transmitter device 112 represents an example loop filter that controls the center frequency of transmitter device 112. Stage 307 represents an example modulation controller that controls deviation from the center frequency. Stage 310 represents an example mixer for signals generated by stage 305 and stage 307. Stage 315 represents an example tank circuit stimulated by the output of stage 310. Signal RFOSC generated by stage 315 feeds into component U2 (e.g., part number BH1417F manufactured by ROHM™) as a carrier frequency. An audio signal generated by microphone 115 feeds into node 330 of transmitter device 112. Stage 320 provides amplification and filtering to the audio input signal. The amplified audio signal form stage 320 feeds into component U2. In general, component U2 is an FM integrated circuit for broadcasting audio signals over an FM carrier.

Component U2 includes an antenna driver that feeds node 340, which connects to a respective antenna such as antenna 160 (e.g., a braided shield of wire encompassing at least a portion of conductors 120 carrying an audio signal generated by microphone 115. Transmitter device 112 accepts vehicle power 122 at node 350 and node 351.

Figure 4:
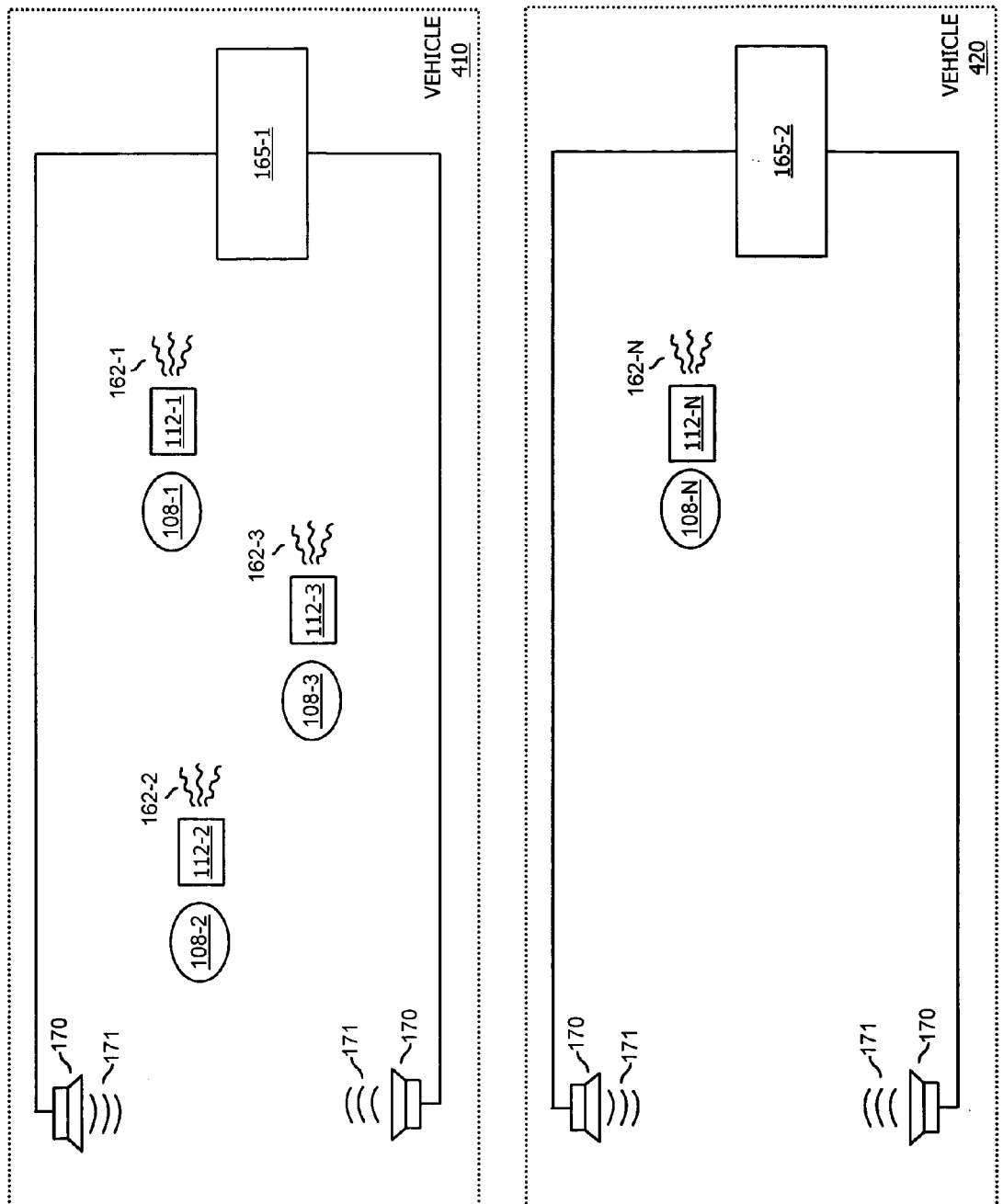
FIG. 4 is a block diagram of an environment suitable for operating one or more transmitter devices according to an embodiment of the invention.

FIG. 4 is a block diagram of an environment suitable for operating one or more transmitter devices according to an embodiment of the invention. As shown, communication environment 400 includes vehicle 410 and vehicle 420. Vehicle 410 includes a radio receiver 165-1 and a corresponding speaker system 170-1. As discussed, a single user 108 in vehicle can operate transmitter device 112 to communicate over speaker system 170-1 to other passengers in vehicle 410.

According to the embodiment shown, each of multiple users 108 in the communication environment 400 can operate their own respective transmitter device 112 for speaking over the radio channel to which the radio is tuned. For example, user 108-1 operates transmitter device 112-1 to generate wireless radio signal 162-1 to radio receiver 165-1 to speak over speaker system 170, user 108-2 operates transmitter device 112-2 to generate wireless radio signal 162-2 to radio receiver 165-1 to speak over speaker system 170, etc. When a respective user 108 speaks into a respective transmitter device 112, the corresponding transmitter device 112 transmits a corresponding audio signal to the radio receiver 165 to play over the speaker system 170. For example, each transmitter device 112 can be configured to generate a signal to the radio receiver when sound is detected. A corresponding control circuit 150 of each respective transmitter device 112 is selectively activated such that a respective transmitter device i) generates a given wireless radio signal 162 to the radio receiver 165-1 when a respective user 108 speaks into an associated microphone device 115 and ii) does not generate a given wireless radio signal 162 to the radio receiver 165-1 when a respective user 108 does not speak into an associated microphone 115. Consequently, multiple passengers or users 108 in the vehicle 410 can communicate over the radio receiver 165-1 without interfering with each other. That is, while one passenger is speaking into a respective transmitter device 112, the other passengers can listen to the sound generated by speaker system 170 driven by the radio receiver 165-1. When one passenger discontinues speaking, another passenger in the vehicle 410 may speak over the radio receiver 165 to other passengers.

In one application, the power level of the wireless radio signal 162 from a transmitter device 112-1 is powerful enough to be received by a radio receiver 165-2 in another vehicle such as vehicle 420. In a similar vein, the transmitter device 112-N can generate a wireless radio signal 162-N, which is strong enough to be received by radio receiver 165-1 in vehicle 410. Thus, users 108 in each of the vehicles can communicate not only to persons in their own vehicle but also to persons in another nearby vehicle having its radio receiver 165-2 tuned to the appropriate carrier frequency of the transmitter devices 112.

Figure 5:
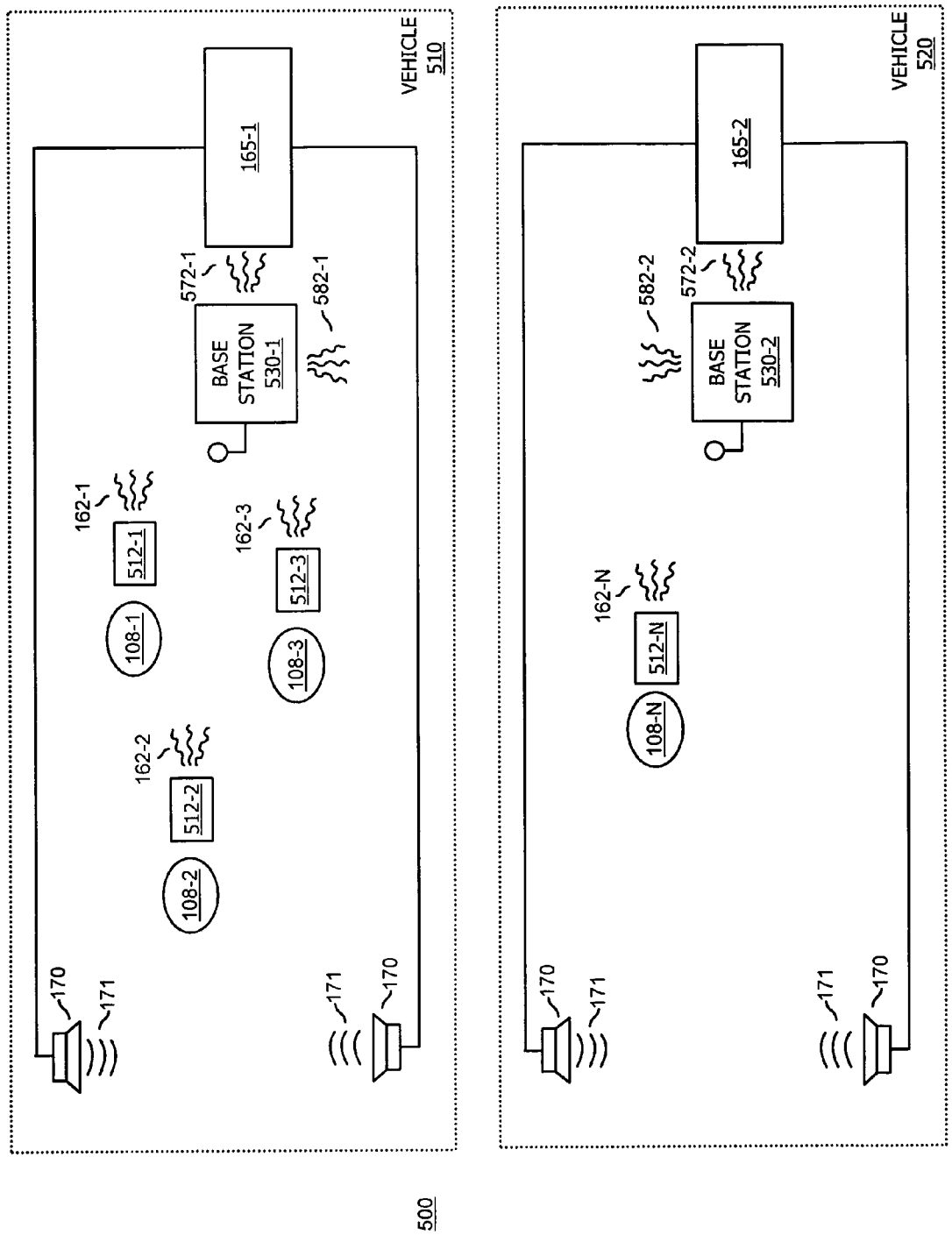
FIG. 5 is a block diagram of an environment suitable for operating one or more transmitter devices according to an embodiment of the invention.

FIG. 5 is a block diagram of an environment suitable for operating one or more transmitter devices according to an embodiment of the invention. As shown, vehicle 510 includes a radio receiver 165-1 coupled to drive a corresponding speaker system 170. Each user 108 operates their own corresponding transmitter device 512 to generate a respective wireless radio signal 562 (e.g., a wireless radio signal different than the frequency to which the radio receiver is tuned). Base station 530-1 receives the wireless radio signals 562 and demodulates a respective signal to produce the original audio input generated by users 108. Similar to the transmitter device 112 discussed above, the base station 530-1 modulates the original audio signal onto, for example, an FM carrier frequency for transmission to radio receiver 165-1.

Thus, vehicular communication system 500 according to an embodiment of the invention expands upon the principles discussed above. For example, vehicular communication system 500 enables multiple users to share communications over a radio receiver 165 and corresponding speaker system 170 in a respective vehicle 510, 520. The vehicular communication system 500 includes transmitter devices 512 (similar in some respects to those discussed above) for use by corresponding users 108 in the vehicle 510 as well as a base station device 530 to receive corresponding wireless radio signals from the at least two transmitter devices. During operation, the base station 530 receives signals from the transmitter devices 512 and conveys audio signals from the transmitter devices 512 onto the respective radio receiver 165.

In one embodiment, transmitter devices 512 generate respective radio signals at a low power level that can be detected only in the vehicle in which the transmitter device 512 resides. For example, base station 530-1 can detect radio signals generated by transmitter device 512-1 and 512-2 but not 512-N. To support communication with passengers in other vehicles, each base station 530 includes circuitry to transmit the audio signals over a different carrier frequency (e.g., a frequency supporting longer range transmission and reception) to a base station 530 located in another vehicle.

In one application, base stations 530 couple to corresponding cellular phones that provide full duplex communication of audio signals between the base stations 530 in each vehicle. For example, base station 530-1 receives the audio signals generated by users 108 in vehicle 510 as discussed. The audio signals are conveyed to radio receiver 165-1. Base station 530-1 couples to a cellular phone that in turn transmits the audio signals to another cell phone coupled to base station 530-2. Base station 530-2 receives the audio signals form the cellular phone and modulates the audio signals onto an FM carrier frequency for receipt by radio receiver 165-2 and playback on speaker system 170. In an opposite direction, base station 530-2 transmits audio signals received from transmitter devices 512 in vehicle 520 to receiver radio 165-2 as well as to a cellular phone coupled to base station 530-2. The cellular phone coupled to base station 530-2 conveys the audio signals detected from users 108 in vehicle 520 to base station 520-1 for playback on its respective speaker system. In other words, respective cellular phones transmit and receive wireless radio signals 582-1 and 582-2. Consequently, the vehicle communication system 500 enables multiple persons in vehicles 510 and 520 to communicate amongst each other over respective, existing radio equipment such as radio receivers 165-1 and 165-2 and cellular phones.

Each of the transmitter devices 512 includes a microphone 115, an input port 124, a modulator 135, and an antenna 160 as discussed above. The microphone 115 of each transmitter device 112 receives audio signals generated by corresponding users' voices. The input port 124 of each transmitter device 512 receives audio input from a corresponding user 108 in the vehicle speaking into the respective microphone 115. The modulator device 135 of each transmitter device 512 modulates the audio input received from the input port 124 onto a first carrier frequency (e.g., not an FM frequency but instead another carrier capable of being received by the base station) to produce a modulated signal. The antenna 160 of each transmitter device 512 receives the modulated signal and transmits a corresponding wireless radio signal 562 to a respective base station 530 in vehicle 510 or 520.

The base station 530 receives corresponding wireless radio signals from the transmitter devices 512 in the respective vehicles. The base station 530 includes a receiver to receive signals from the transmitter devices 512, a modulator and an antenna. The receiver of the base station 530 receives the corresponding wireless radio signals 562 and detects corresponding audio input generated by a corresponding user in the vehicle speaking into the microphone 115. The modulator of the base station 530 modulates the corresponding audio input received from the transmitter devices 512 onto an FM (Frequency Modulated) carrier frequency to produce a modulated signal. The carrier frequency is between 89 and 108 megahertz, which is a standard range for FM radio carriers in the United States. The antenna 160 the base station 530, based on the modulated signal, transmits a wireless radio signal 562 to a radio receiver 165 in the respective vehicle. The radio receiver 165 in the vehicle is tuned to i) receive the wireless radio signal 572 and ii) play the audio input received from the users 108 over the speaker system 170 of a respective vehicle. Consequently, the base station 530 enables multiple users 108 (or an expanded number of users) to communicate in the vehicle over a speaker system 170 associated with the radio receiver 165. That is, vehicular communication system 500 can include only a single base station capable of receiving communication signals from multiple users in the vehicle and transmitting such audio input to a radio receiver 165 for playback in real-time or near real-time.

In furtherance of the aforementioned embodiment, each of the transmitter devices 512 are operated by respective users 108 in a vehicle to selectively generate corresponding wireless radio signals 562 from the multiple transmitter devices 512 to the radio receiver 165 in response to the users 108 speaking into respective microphones 115. For example, and more particularly, each of the transmitter devices 562 are activated in a shared environment such that a respective transmitter device 562 i) generates a given wireless radio signal to the base station 530 when a respective user 108 speaks into an associated microphone 115 of the transmitter device 512 and ii) does not generate a given wireless radio signal 562 to the base station 530 when a respective user 108 does not speak into an associated microphone of the transmitter device 512. This technique reduces interference of multiple signals received at the base station 530.

Figure 6:
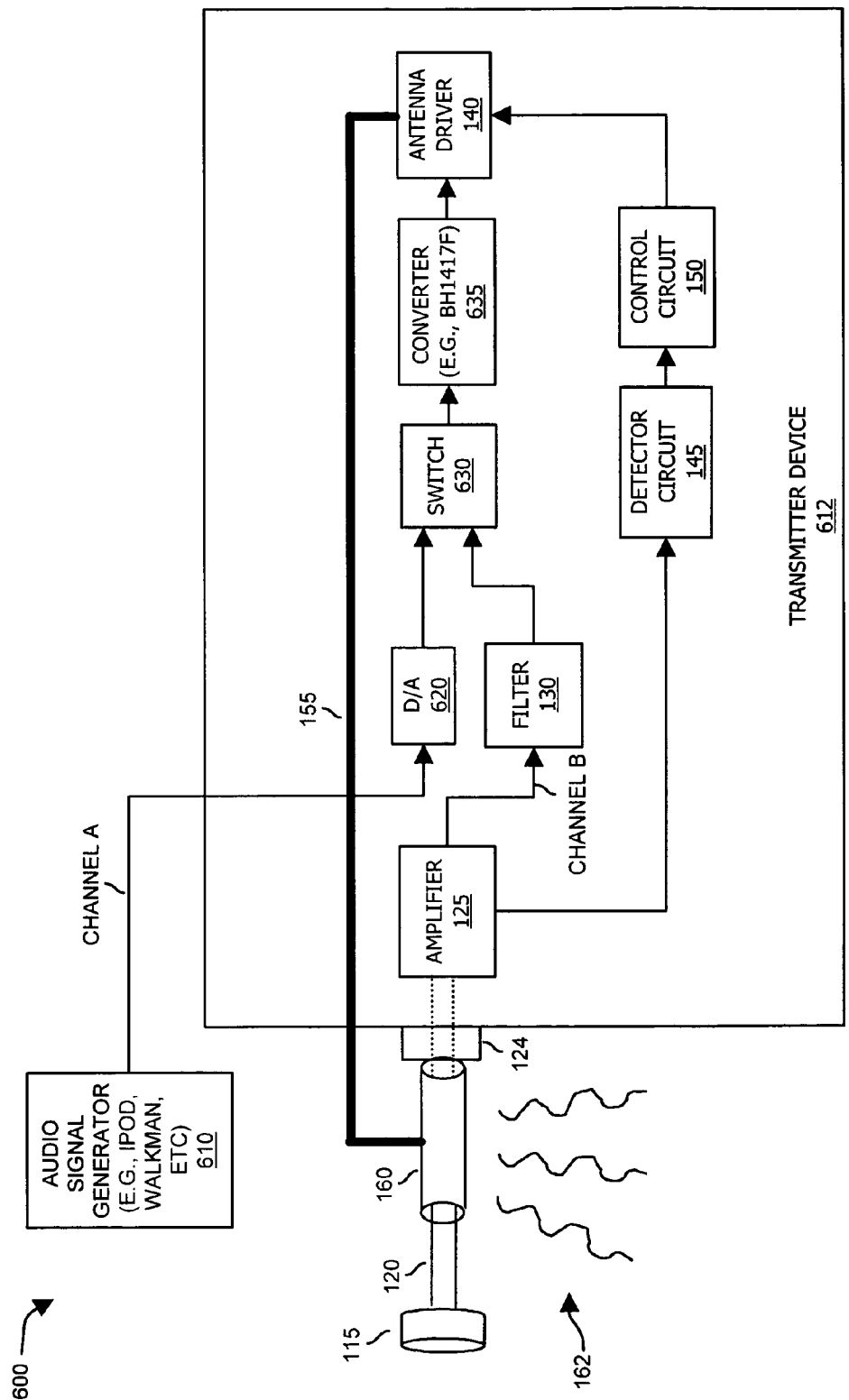
FIG. 6 is a block diagram of a transmitter device configured to operate according to an embodiment of the invention.

FIG. 6 is a diagram of transmitter device 612 in acoustical environment 600 according to another embodiment of the invention. As shown, several components of transmitter device 112 as shown in FIG. 1 have been replaced to produce transmitter device 612. Functionality is similar to transmitter device 112 except transmitter device 612 enables a user to select, via switch 630 (e.g., manual or electronic switch), an audio input signal between microphone 115 and audio signal generator 610. In one embodiment, audio signal generator 610 such as an IPOD™ device generates an audio signal such as music. D/A (Digital-to-Analog) converter 630 converts a digital signal from audio signal generator 610 into an analog signal driven to switch 630. Switch 630 enables a user of transmitter device 612 to select between playing an audio signal from audio signal generator 610 and playing an audio signal generated by microphone 115 on speaker system 170 in a respective vehicle or other acoustical environment.

In one embodiment, switch 630 is a summer circuit that enables a user to play music and talk over speaker system 100 at the same time.

In another embodiment, switch 630 plays an audio signal generated by audio signal generator 610 except when detecting a presence of an audio signal from microphone 115.

Any or all of the above mentioned functions can be supported by transmitter device 612. For example, transmitter device 612 may include a switch to select one of the four different mode settings as discussed. Modes can include: i) play channel A only, ii) play channel B only, iii) sum channel A and B for playing on speaker system 170 at the same time, and iv) play channel A except when detecting presence of a signal on channel B (e.g., playback the audio signal of user speaking into microphone 115 in lieu of music generated by generator 610).

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A method for communicating over a radio receiver in a vehicle to at least one passenger therein, the method comprising:
   receiving power from a power source to power a microphone;
   receiving audio input from a user in the vehicle speaking into the microphone;
   modulating the audio input onto a carrier frequency to produce a wireless radio signal; and
   transmitting the wireless radio signal to the radio receiver in the vehicle, the radio receiver being tuned to i) receive the wireless radio signal at the carrier frequency and ii) play the audio input over at least one corresponding speaker; and
   enabling the user to select which of multiple sources to receive audio input for modulating onto the wireless radio signal and playing on the at least one corresponding speaker, a first source being the microphone into which the user speaks, a second source being a generator device that generate an audio signal for playback.

2. A method as in claim 1 further comprising:
   providing a filter to limit which range of frequencies associated with the audio input are modulated onto the carrier frequency to produce the wireless radio signal transmitted to the radio receiver in the vehicle.

3. A method as in claim 2 further comprising:
   enabling the filter to limit the range to frequencies of the audio input modulated onto the carrier frequency to below 4500 hertz.

4. A method as in claim 2 further comprising:
   enabling the filter to limit the range to frequencies of the audio signal modulated onto the carrier frequency to below 3000 hertz.

5. A method as in claim 4, wherein transmitting the wireless radio signal includes:
   transmitting the wireless radio signal to the radio receiver in the vehicle over an antenna that is disposed parallel to a wire that conveys the audio signal received from the microphone, the carrier frequency of the wireless signal being between 89 and 108 megahertz.

6. A method as in claim 1, wherein transmitting the wireless radio signal includes:
   transmitting the wireless radio signal to the radio receiver in the vehicle over an antenna that is disposed parallel to a wire that conveys the audio signal received from the microphone.

7. A method as in claim 1, wherein transmitting the wireless radio signal to the radio receiver in the vehicle includes transmitting the wireless radio signal from the user who is located external to the vehicle, the user speaking to passengers in the vehicle over the radio receiver tuned to receive the wireless radio signal.

8. A method as in claim 1, wherein transmitting the wireless radio signal to the radio receiver in the vehicle includes:
   detecting when the user generates the audio input by speaking into the microphone; and
   selectively activating a transmitter device to transmit the wireless radio signal to the radio receiver in the vehicle in response to detecting when the user speaks into the microphone.

9. A method as in claim 8 further comprising:
   enabling multiple transmitter devices operated by respective users in the vehicle to selectively generate corresponding wireless radio signals from the multiple transmitter devices to the radio receiver in response to the users speaking into respective microphones of the multiple transmitter devices, the multiple transmitter devices being activated such that a respective transmitter device generates a given wireless radio signal to the radio receiver when a respective user speaks into an associated microphone.

10. A method as in claim 8 further comprising:
    providing a filter to limit which range of frequencies associated with the audio input are modulated onto the carrier frequency to produce the wireless radio signal transmitted to the radio receiver in the vehicle;
    enabling the filter to limit the range to frequencies of the audio input modulated onto the carrier frequency to below 4500 hertz; and
    wherein transmitting the wireless radio signal includes transmitting the wireless radio signal to the radio receiver in the vehicle over an antenna that is disposed parallel to a wire that conveys the audio signal received from the microphone.

11. A method as in claim 1 further comprising:
    receiving an audio signal from at least one audio source other than the microphone;
    enabling selection of at least one of the audio signal or the audio input for transmission to the radio receiver; and
    wherein modulating the audio input onto the carrier frequency to produce a wireless radio signal occurs in response to receiving selection of the audio input.

12. A method as in claim 1, wherein transmitting the wireless radio signal includes:
    initiating transmission of the wireless radio signal, which is based on a selected FM radio carrier frequency in a range including multiple options between 88 and 108 megahertz, to the radio receiver tuned to receive on the selected FM radio frequency.

13. A method as in claim 1 further comprising:
    enabling the user to select both the audio input received from the user speaking into the microphone as well as the audio signal received from the generator device for modulating on to the wireless radio signal for subsequent playback over the at least one corresponding speaker.

14. A method as in claim 1, wherein transmitting the wireless radio signal to the radio receiver in the vehicle includes transmitting the wireless signal to an AM/FM car radio installed in the vehicle, the AM/FM car radio tuned to receive the wireless radio signal at the carrier frequency.

15. A method as in claim 1, wherein transmitting the wireless radio signal to the radio receiver includes transmitting the wireless signal at a power level to overpower a radio station signal broadcasting at the carrier frequency.

16. A method as in claim 1 further comprising:
based on input from the user, receiving selection of the carrier frequency from multiple possible carrier frequency options.

17. A transmitter device for communicating to at least one occupant in a vehicle, the transmitter device comprising:
a cable to receive power from a power source, the power at least in part being used to power a microphone associated with the transmitter device;
a first input port on which to receive audio input from a user in the vehicle speaking into the microphone;
a second input port on which to receive audio input from a source other than the microphone;
a switch to select the audio input from the user speaking into the microphone for transmission to the radio receiver;
a modulator device to modulate the audio input received from the first input port onto a carrier frequency to produce a modulated signal; and
an antenna device coupled to receive the modulated signal and transmit a wireless radio signal to a radio receiver in the vehicle, the radio receiver being tuned to i) receive the wireless radio signal and ii) play the audio input received from the user over at least one corresponding speaker associated with the radio receiver.

18. A transmitter device as in claim 17 further comprising:
a filter to limit which range of frequencies associated with the audio input are modulated onto the carrier frequency to produce the wireless radio signal transmitted to the radio receiver in the vehicle.

19. A transmitter device as in claim 18, wherein the filter limits the range to frequencies of the audio input modulated onto the carrier frequency to those below 4500 hertz.

20. A transmitter device as in claim 18, wherein the filter limits the range to frequencies of the audio signal modulated onto the carrier frequency to those below 3000 hertz.

21. A transmitter device as in claim 20, wherein at least a portion of the antenna device is disposed in parallel to a wire that conveys the audio signal received from the microphone to the first input port, the carrier frequency of the wireless signal being between 88 and 108 megahertz.

22. A transmitter device as in claim 17, wherein at least a portion of the antenna device is disposed in parallel to a wire that conveys the audio signal received from the microphone to the first input port.

23. A transmitter device as in claim 17 further comprising:
a detector circuit to detect when the user generates the audio input by speaking into the microphone; and
a control circuit to i) activate the transmitter device to transmit the wireless radio signal to the radio receiver in the vehicle when the user generates sound into the microphone, and ii) deactivate the transmitter device from transmitting the wireless radio signal to the radio receiver in the vehicle when the user does not generate sound into the microphone.

24. A system including a transmitter device as in claim 23, the system further comprising:
multiple transmitter devices, each being similar in configuration to the transmitter device of claim 18, the multiple transmitter devices being operated by respective users in the vehicle to selectively generate corresponding wireless radio signals from the multiple transmitter devices to the radio receiver in response to the users speaking into respective microphones of the multiple transmitter devices, the multiple transmitter devices being activated such that a respective transmitter device i) generates a given wireless radio signal to the radio receiver when a respective user speaks into an associated microphone device and ii) does not generate a given wireless radio signal to the radio receiver when a respective user does not speak into an associated microphone.

25. A transmitter device as in claim 23 further comprising:
a filter to limit which range of frequencies associated with the audio input are modulated onto the carrier frequency to produce the wireless radio signal transmitted to the radio receiver in the vehicle, the filter limiting the range to frequencies of the audio input modulated onto the carrier frequency to below 1500 hertz; and
wherein the antenna device is disposed in parallel to a wire that conveys the audio signal received from the microphone.

26. A system enabling multiple users to share communications over a radio receiver and corresponding at least one speaker in a vehicle, the system comprising:
a.) at least two transmitter devices, each of the at least two transmitter devices comprising:
a microphone;
an input port on which to receive audio input from a corresponding user in the vehicle speaking into the microphone;
a modulator device to modulate the audio input received from the input port onto a first carrier frequency to produce a modulated signal; and
an antenna device coupled to receive the modulated signal and transmit a corresponding wireless radio signal; and
b.) a base station device to receive corresponding wireless radio signals from the at least two transmitter devices, the base station device comprising:
a receiver to receive the corresponding wireless radio signals and detect corresponding audio input generated by a corresponding user in the vehicle speaking into the microphone;
a modulator device to modulate the corresponding audio input received from the at least two transmitter devices onto an FM (Frequency Modulated) carrier frequency to produce a modulated signal, the carrier frequency being between 89 and 108 megahertz; and
an antenna device coupled to receive the modulated signal and transmit a wireless radio signal to a radio receiver in the vehicle, the radio receiver being tuned to i) receive the wireless radio signal and ii) play the audio input received from the user over at least one corresponding speaker associated with the radio receiver.

27. A system as in claim 26, wherein the at least two transmitter devices are operated by respective users in the vehicle to selectively generate corresponding wireless radio signals from the multiple transmitter devices to the radio receiver in response to the users speaking into respective microphones of the multiple transmitter devices, each of the at least two transmitter devices being activated such that a respective transmitter device i) generates a given wireless radio signal to the base station when a respective user speaks into an associated microphone device and ii) does not generate a given wireless radio signal to the base station when a respective user does not speak into an associated microphone.

28. A system as in claim 27, wherein the base station couples to a cellular phone and the base station transmits the audio input over the cellular telephone.

* * * * *